Feb. 2, 1965            A. STREET            3,168,274
SUPPORTING STAND FOR INSTRUMENTS, TOOLS AND THE LIKE
Filed Sept. 17, 1963
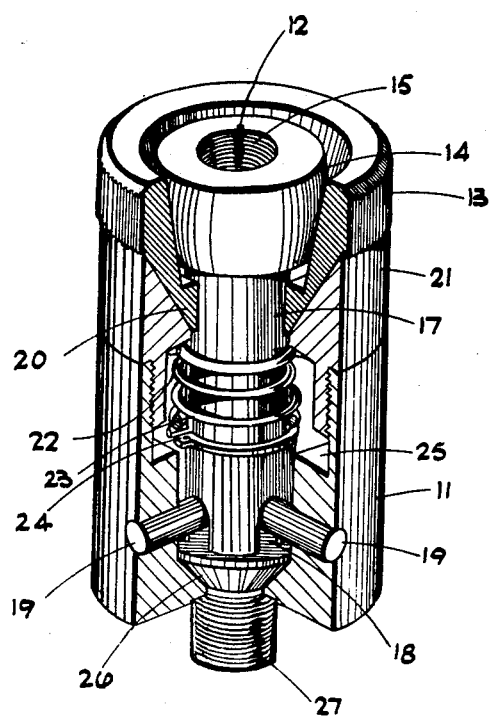
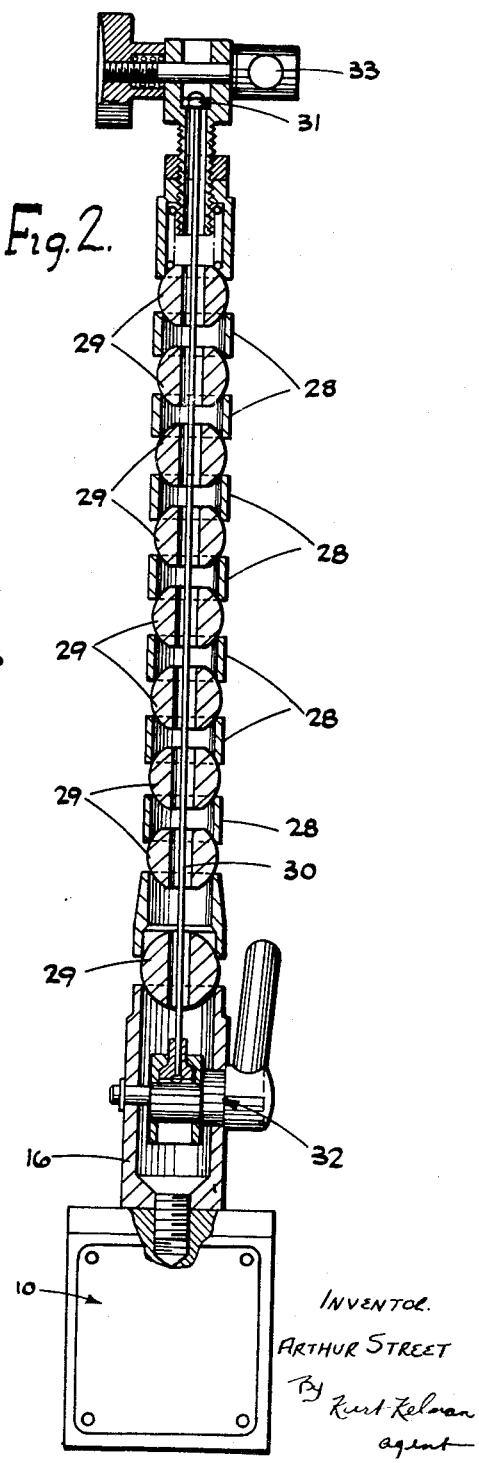
INVENTOR.
ARTHUR STREET
By Kurt Kelman
agent United States Patent Office 3,168,274
Patented Feb. 2, 1965

3,168,274
SUPPORTING STAND FOR INSTRUMENTS, TOOLS AND THE LIKE
Arthur Street, Tamworth, England, assignor to Polymathic Engineering Company Limited, Tamworth, England, a British company
Filed Sept. 17, 1963, Ser. No. 309,543
Claims priority, application Great Britain, Sept. 18, 1962, 35,412/62
2 Claims. (Cl. 248—176)

This invention relates to supporting stands for instruments, tools and the like, for example, scribers, micrometer gauges and clock indicators, having a plunger, rocker, feeler element or the like.

Snake type stands for clock indicators are well known. The stand can be bent and locked in any required position so that the plunger projecting from the clock can be adjusted to test a surface of a workpiece. Adjustments are carried out by unlocking the stand and then relocking in the required position. The disadvantage of the above type of stand is that when it is desired to carry out a fine adjustment, it is necessary to unlock the stand and then to adjust the position of the plunger on the surface of the workpiece, and even then accurate adjustments may not always be possible.

It is an object of the present invention to provide a supporting stand for instruments, tools and the like, in which the above disadvantage is mitigated.

It is a further object of the present invention to provide a supporting stand which includes a base member, an arm and an arm supporting element in which means are provided whereby the end of the arm remote from the arm supporting element can be caused to trace out an orbital adjustment path.

The invention will now be described by way of example with reference to the accompanying drawings in which:

FIGURE 1 is quarter section in perspective of a supporting stand, and

FIGURE 2 is a part sectional view of the stand and an arm supported by it.

The supporting stand 10 includes a base member 11 having a cup-shaped socket and an arm supporting element 12 disposed within the socket and an operating element 13 surrounding the element 12.

The arm supporting element 12 includes a part-spherical portion 14 having a screw threaded socket 15 into which the lower end of the arm 16 is adapted to be fitted and a cylindrical portion 17 projecting from the part-spherical portion 14. A pair of intersecting channels or grooves 18 are disposed at right angles to each other in the base of the part-spherical portion 14. Studs 19 are secured to the base member 11 and these studs 19 serve to locate the arm supporting element in the socket in the base member 11 and to permit limited rocking movement of the arm supporting element relative to the base member 11. The operating element 13 is provided with an eccentric rim flange 20 which co-operates obliquely with the part-spherical portion 14 of the arm supporting element 12 at a position spaced longitudinally from the studs 19.

When the operating element 13 is rotated the arm supporting element 12 is displaced about its reference axis in such a way that the end of the arm 16 remote from the arm supporting element 12 traces out an orbital path. The reference axis is the central vertical axis of the base member 11.

A screw threaded member 21 surrounds the rim flange 20 of the operating element 13 and is screw threaded externally at its lower end for threaded engagement with a screw threaded portion of the base member 11. The member 21 is provided with an angular rim 22 which projects laterally from the inner surface of the member. A compression spring 23 surrounds the cylindrical portion of the operating element and one end of the spring bears against this annular rib and the other rests upon a circlip 24 which is disposed around the lower end of the arm supporting element and bears against a shelf 25 of the base member 11.

The base portion of the base member is formed with a central hole 26 which receives a headed screw 27 for attachment of the base member to a magnetic holding device so that it may be held firmly on a workbench or table.

The outer surface of the operating element is roughened or serrated near its upper end so that it can easily be gripped for rotating it around the arm supporting element 12. The arm 16 consists of a series of cylindrical sleeves 28 with a ball 29 disposed between the adjacent ends of each pair of sleeves. A flexible element 30 passes inside the arm through the balls and one end of the flexible element is secured to the upper end of the arm by means of a nut 31 and the other end of the flexible element is secured to a locking mechanism 32 provided near the lower end of the arm. Operation of the locking mechanism 32 makes the arm 16 rigid in any desired position. To the upper end of the arm is attached a measuring instrument 33 which has a plunger, or feeler element adapted to be moved over a surface of a workpiece. The plunger element is placed in position on the surface of the workpiece to be tested, the arm is locked to make it rigid and then if any further adjustment of the position of the plunger element is required this adjustment is carried out by slowly rotating the operating element 13.

When the operating element 13 is rotated the frictional forces between the rim flange 20 and the co-operating part-spherical portion 14 of the arm supporting element 12 cause the arm supporting element to be displaced obliquely with respect to the reference axis so that the upper end of the arm 16 traces out an orbital adjustment path and hence the position of the plunger can be accurately adjusted.

In an alternative construction (not shown) the supporting stand includes a cylindrical base member, an arm supporting element disposed with the base member and an operating element surrounding the base member, the arm supporting element being mounted near the lower end of the base member by means of a swivel joint.

The arm supporting element includes a part-spherical portion having a screw-threaded socket, into which the lower end of the arm is adapted to be engaged and a cylindrical portion projecting from the part-spherical portion with a slot formed at the lower end of the cylindrical portion, so as to form two tongues.

The base member houses only the cylindrical portion of the arm supporting element, the internal diameter of the base member being slightly greater than the diameter of said cylindrical portion, so as to permit limited rocking movement of the arm supporting element. The base member is mounted on a magnetic holding device so that it may be held firmly on a workbench or table.

The operating element is provided with an eccentric rim flange co-operating obliquely with the part-spherical portion of the arm supporting element at a position spaced longitudinally above the swivel joint, the sides of the eccentric rim flange being upwardly converging. When the operating element is rotated the arm supporting element is displaced around its reference axis in such a manner that the end of the arm remote from the arm supporting element traces out an orbital path. A spring washer is provided between the arm supporting element and the lower end of the arm and above the rim flange of the operating element. The spring washer assists the rocking movement of the arm supporting element and reduces wear between the arm supporting element and the lower end of the arm.

The swivel joint includes a pivot pin adapted to be engaged within the slot between the two tongues of the cylindrical portion of the arm suporting element, the end of the pivot pin being engaged within two diametrically opposed holes formed in the base member. The pivot pin is pivotally secured at its centre by means of a dowel pin, the two ends of which are engaged within holes formed in the tongues of the arm supporting element. The dowel pin is placed in its pivotal position through two diametrically opposed holes formed in the base member at right angles to the two holes engaging the ends of the pivot pin. The pivot pin is of substantially dumb-bell shape, the surface of the pivot pin adjacent the co-operating surfaces of said tongues being plain, and the ends of the pivot pin being of substantially part-spherical form which abut against the inner side of the sleeve.

What I then claim is:

1. A supporting stand for instruments, tools and the like which includes a base member, an arm, an arm supporting element mounted on said base member for supporting the arm in oblique relation to a reference axis and an operating element movable to co-operate with the arm supporting element to displace the arm and arm supporting element around the reference axis so that the end of the arm remote from the arm supporting element traces out an orbital adjustment path, the arm supporting element including a part-spherical portion to which the end of the arm is connected and a cylindrical portion projecting from said part-spherical portion and mounted on the base member in such a manner as to permit limited rocking movement of the arm supporting element.

2. A supporting stand according to claim 1 in which the operating element is in the form of a sleeve and has an eccentric rim flange which engages the part-spherical portion of the arm supporting element.

References Cited by the Examiner
UNITED STATES PATENTS

| | | | |
|---|---|---|---|
| 1,166,018 | 12/15 | Soresi | 248—181 X |
| 2,424,011 | 7/47 | De Gramant | 248—178 |
| 3,024,049 | 3/62 | Tranos | 248—181 X |

CLAUDE A. LE ROY, *Primary Examiner.*